Aug. 17, 1943.　　　A. E. RYLANDER　　　2,327,068
ASSEMBLY APPARATUS
Filed Jan. 8, 1941　　　6 Sheets-Sheet 2

INVENTOR.
ANDREW E. RYLANDER.
BY

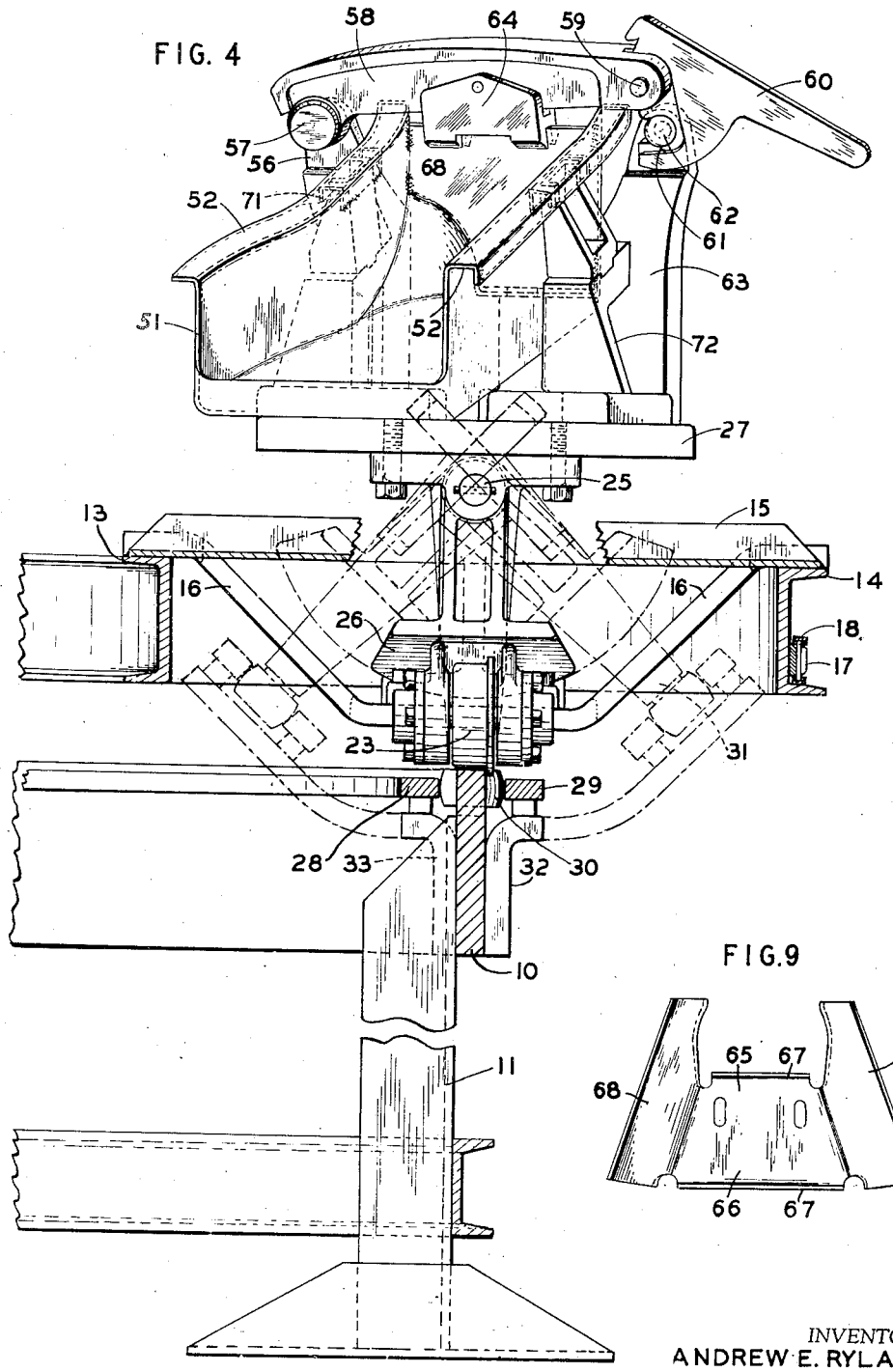
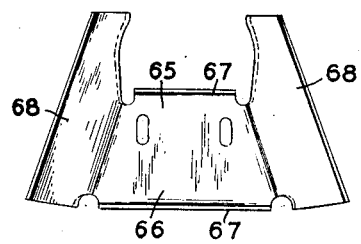

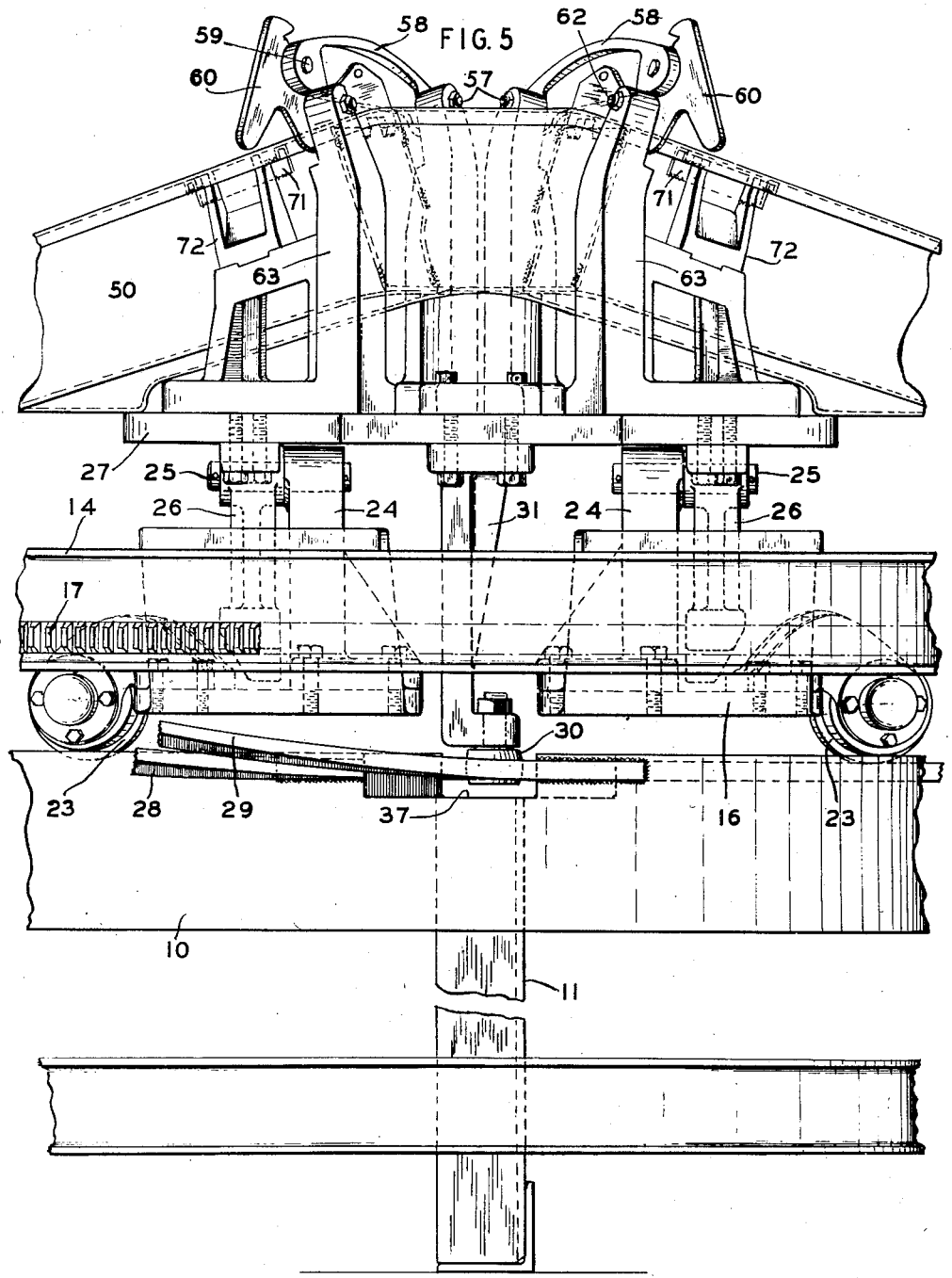

Aug. 17, 1943.  A. E. RYLANDER  2,327,068
ASSEMBLY APPARATUS
Filed Jan. 8, 1941  6 Sheets-Sheet 5

INVENTOR.
ANDREW E. RYLANDER.
BY

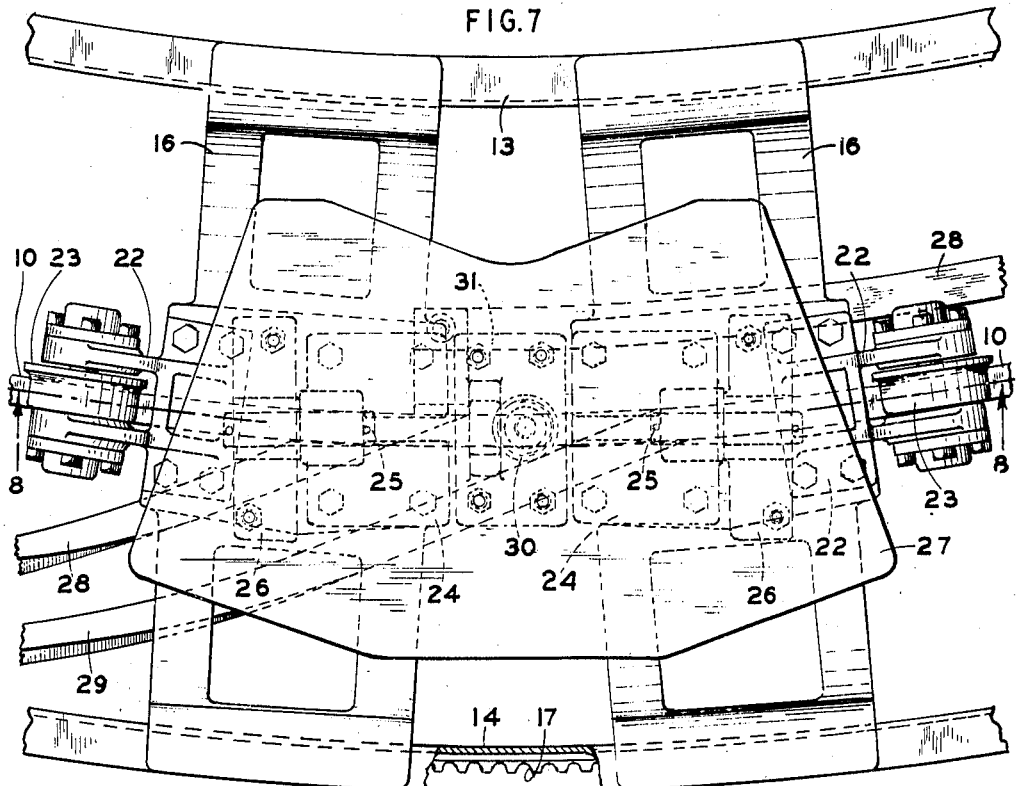
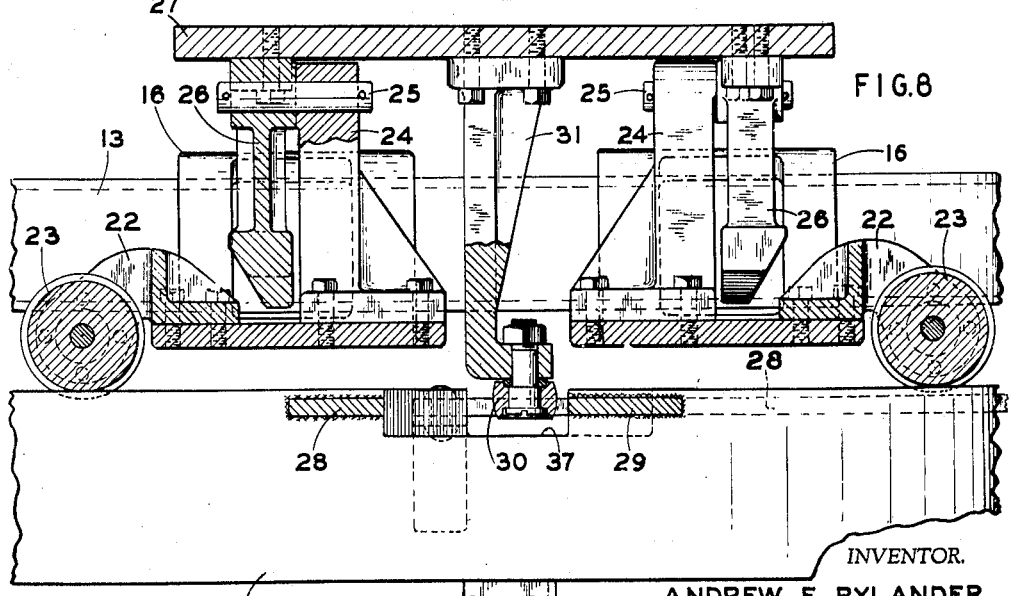

Patented Aug. 17, 1943

2,327,068

UNITED STATES PATENT OFFICE 2,327,068

ASSEMBLY APPARATUS

Andrew E. Rylander, Detroit, Mich., assignor to The Midland Steel Products Company, Cleveland, Ohio, a corporation of Ohio Application January 8, 1941, Serial No. 373,629

11 Claims. (Cl. 198—209)

This invention relates to new and useful improvements in assembly apparatus and its primary object is to facilitate the manufacture of products requiring many assembling operations in close quarters and where the position of a cumbersome or unwieldy product may be changed several times to render certain portions thereof most accessible to various operators in a minimum amount of time and whereby the operator is relieved of all handling of the product so that his entire time can be devoted to the actual assembling operations, thereby resulting in the greatest productivity per unit of time and manpower.

This contemplates the automatic transfer of products from one operator to another with the product properly positioned for work thereon as soon as it reaches the second and consecutive operators, and is returned substantially to the point where the product was diverted from the main assembly line.

Another object of the invention is to provide an assembly apparatus requiring the minimum effort of the operators, and one which is gravity actuated to a degree; simple, rugged and capable of use on a variety of products.

Other objects and advantages of the invention will become apparent during the course of the following description.

In the accompanying drawings forming a part of the description and wherein like numerals are employed to designate like parts throughout the several views, Fig. 1 is a top elevational view of the apparatus with the various work holders shown approximately in their relative positions, Fig. 2 is a similar view but with the work holders removed to illustrate the supporting and guide mechanism, Fig. 3 is a transverse section of the same taken on the line 3—3 of Fig. 2 but with the turntable removed therefrom, Fig. 4 is an enlarged vertical and transverse section taken on the lines 4—4 of Fig. 1.

Fig. 5 is a side elevational view of the same portion of the apparatus,

Fig. 7 is a view similar to Fig. 6 but with the work and clamp removed to illustrate the under structure, Fig. 8 is a longitudinal vertical section of one of the supporting structures of the work holders, Fig. 9 is a top plan of a reinforcing insert which is assembled in the product as the latter is being assembled on the apparatus.

Figure 1:
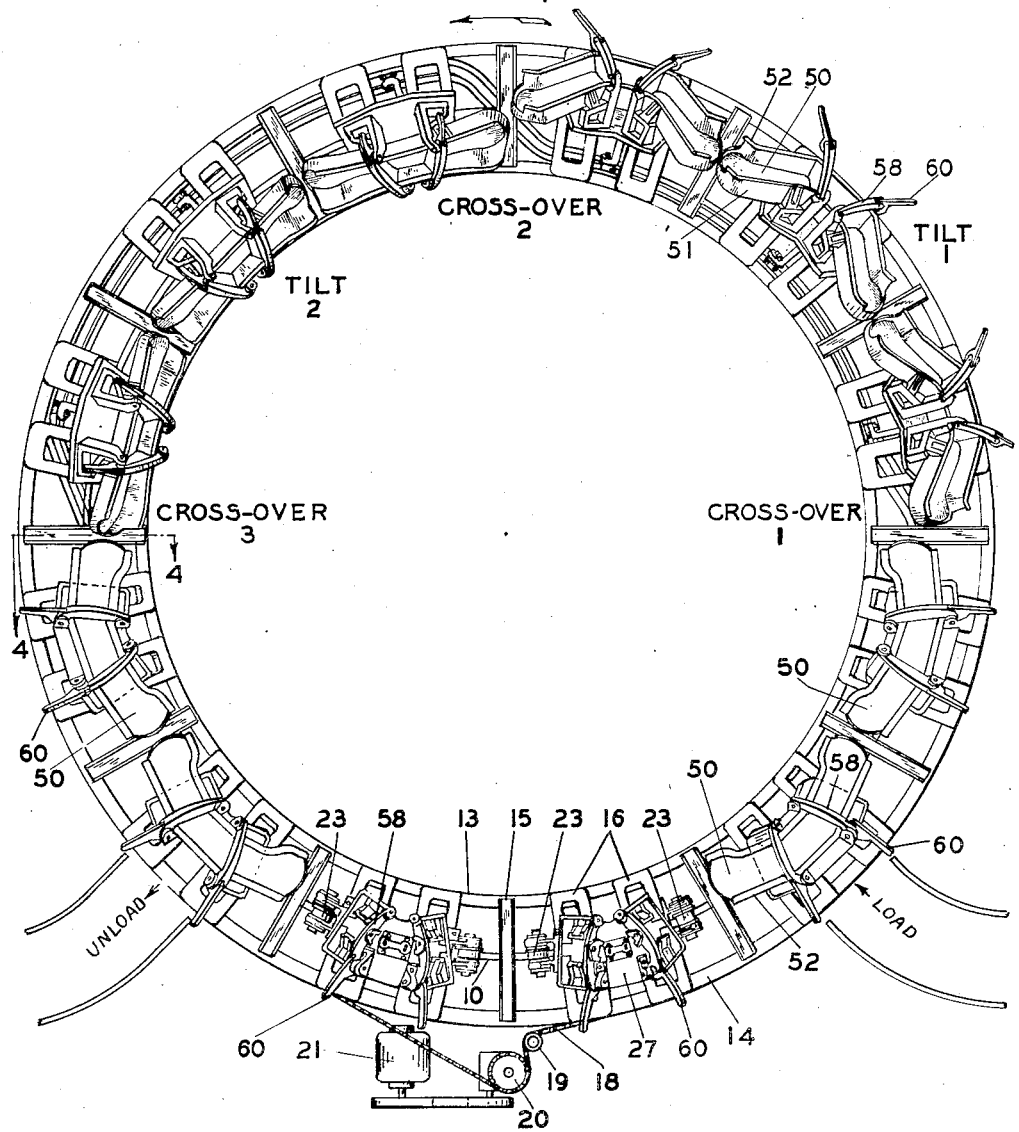

Referring now more particularly to the drawings for details, an annular member or ring 10 is supported at the proper elevation above a floor upon any suitable type of supporting structure 11. This ring forms a circular track for the sole support of a rotary conveyor or turntable 12, composed essentially of inner and outer concentric rings 13 and 14 respectively of channel section as best appreciated in Fig. 4. These two rings are primarily secured together in the position illustrated by a plurality of radially disposed braces 15, spaced at regular intervals around the turntable. Brackets 16 arranged in pairs with opposite ends secured to the tops of the two rings 13 and 14 and their intermediate portions offset downwardly between the rings, are provided for each work support. The brackets of each pair are spaced apart for a purpose to presently appear. The periphery of the outer ring 14 is provided with sprocket teeth 17 adjacent its lower flange for cooperation with an endless chain 18 wrapped about the same and finding some support upon the lower flange. This chain has an outwardly extending loop which engages an idler 19 and a variable speed sprocket 20 driven by a motor 21 or any other suitable source of power.

The side of each bracket 16 is provided with an overhanging roller bracket 22 in which is journaled a cambered roller 23. These rollers support the entire weight of the turntable and work holders and are disposed relatively on an arc to ride upon the circular track 10. Each bracket 16 is also provided with an upstanding trunnion support 24 having a trunnion 25 mounted therein, which trunnions are arranged in substantial longitudinal alignment substantially tangent with the main track 10. A pair of counterweighted depending arms 26 are journaled on the trunnions 25 and are secured at their upper ends to a work supporting plate 27, for mounting the latter on an axis tangent to the main track 10. Thus, the work supports 27 mounted upon the turntable, rotate as a group about a center in an endless path, and each is capable of being oscillated from side to side so as to tilt the work in the direction most convenient for the operator to speedily perform his assigned work thereupon. In order that the work holders will be automatically tilted from side to side through an angle of approximately 90 degrees, at certain intervals in their circuitous travel, a cam guide is provided beneath the turntable and assumes the form of inner and outer parallel rails 28 and 29 respectively, between which operates a roller 30 journaled on the lower end of an arm 31 depending from and secured to the work support 27 between the spaced brackets 16.

Figure 2:
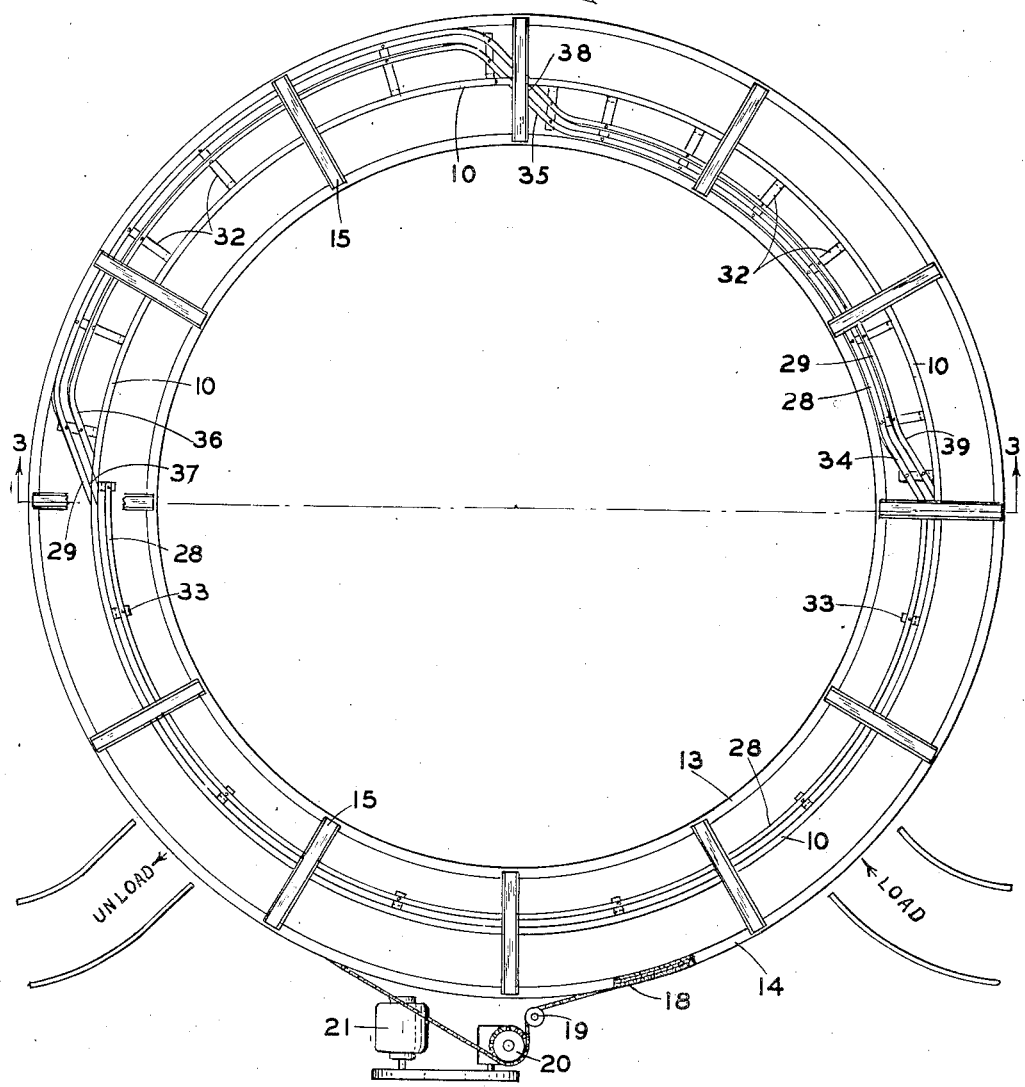
Figure 3:
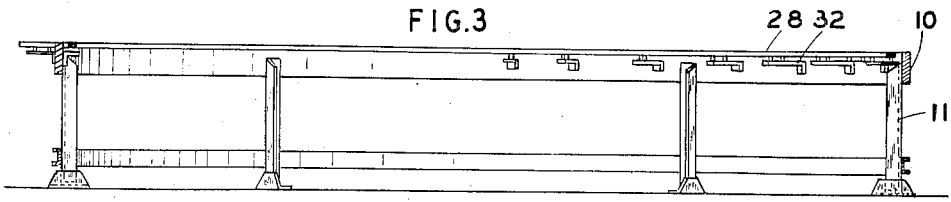

The cam rails 28 and 29 are rigidly supported from the circular track 10 by means of the brackets 32 as clearly shown in Figs. 2 and 4. As best seen in Fig. 2, the inner cam rail 28 is almost continuous through 360 degrees, with one end arranged on the inside of the track 10 and supported therefrom by means of lateral brackets 33. From one end, this cam rail 28 traces, from left to right, a semi-circle counter-clockwise to a diametrically opposite point on the rail 10, where it jogs inwardly as at 34 and then continues around on the inside of track 10 for another 90 degrees where it is offset outwardly as at 35 to cross the track 10. The main track 10 is provided with a cutout portion at 38 to permit the passage of the cam rollers 30 of the work holders from one side of the main rail to the other. From this point the inner cam rail 28 continues around on the outside of the main track for another approximate 90 degrees where it is deflected inwardly as at 36 for a second cross over and to meet and be welded to the outside of the main track as clearly shown in Figs. 5 and 7. At the point where this inner cam rail 36 meets the main supporting track 10, the latter is provided with a second cutout portion 37 to permit the passage of the cam rollers 30 so that the arm 31 is returned to a substantially perpendicular position to right the work support 27 to a substantially horizontal plane.

One end of the outer cam rail 29 is secured to the main track 10 adjacent the cutout portion 37 and is deflected outwardly to continue through 180 degrees paralleling the inner cam rail 28. At the cross over 38 at the top of Fig. 2, the cam rails 28 and 29 stop on one side of the main track 10 and immediately begin at the opposite side so that they are substantially continuous on around through the 180 degrees in parallel relation until the outer end 39 of the outer cam rail, meets and is welded to the inner surface of the main track 10. From this point on and around to the diametrically opposite side of the main track, the inner cam rail 28 and the main track constitute the cam guide by means of which the work supports are maintained substantially horizontal and on even keel for approximately one-half of their circular travel.

While the apparatus herein disclosed is of general utility, it is illustrated in connection with the assembly of front cross members for automobile frames. Each front cross member is designated by the numeral 50 and consists essentially of a channel shaped member having an encircling flange or side wall 51 terminating in laterally extending front and rear flanges 52 and a top wall 53. These cross members are clamped on the work holding portions 27 of the turntable in inverted position so as to render the interior of the cross member most accessible to the assembly operations which must be performed on the inside and undersides of said member. The ends of the cross member are provided with portions 54 for centering of the coil springs of independently sprung wheels of an automobile.

In order to securely clamp a cross member 50 in a jig structure to each work support of the turntable at the loading station shown in Fig. 1, each support 27 at its inner side is provided with a pair of upstanding pivot posts 56, to the upper ends of which are fulcrumed as at 57, clamping bars or members 58. These members swing transversely across the top of the inverted cross member 50 as they are positioned upon the work support and have pivoted to their free ends, by the pivots 59, cam locking levers 60 which have notches 61 to receive detent pins 62 extending laterally from the upper ends of a pair of posts 63, secured to the work support 27 at the opposite side of the work. Pivoted to the intermediate portion of the locking bar 58 is a depending clamp 64 having its lower edge forked or slotted to straddle the upper edge of a reinforcement plate 65 of the cross member.

Figure 6:
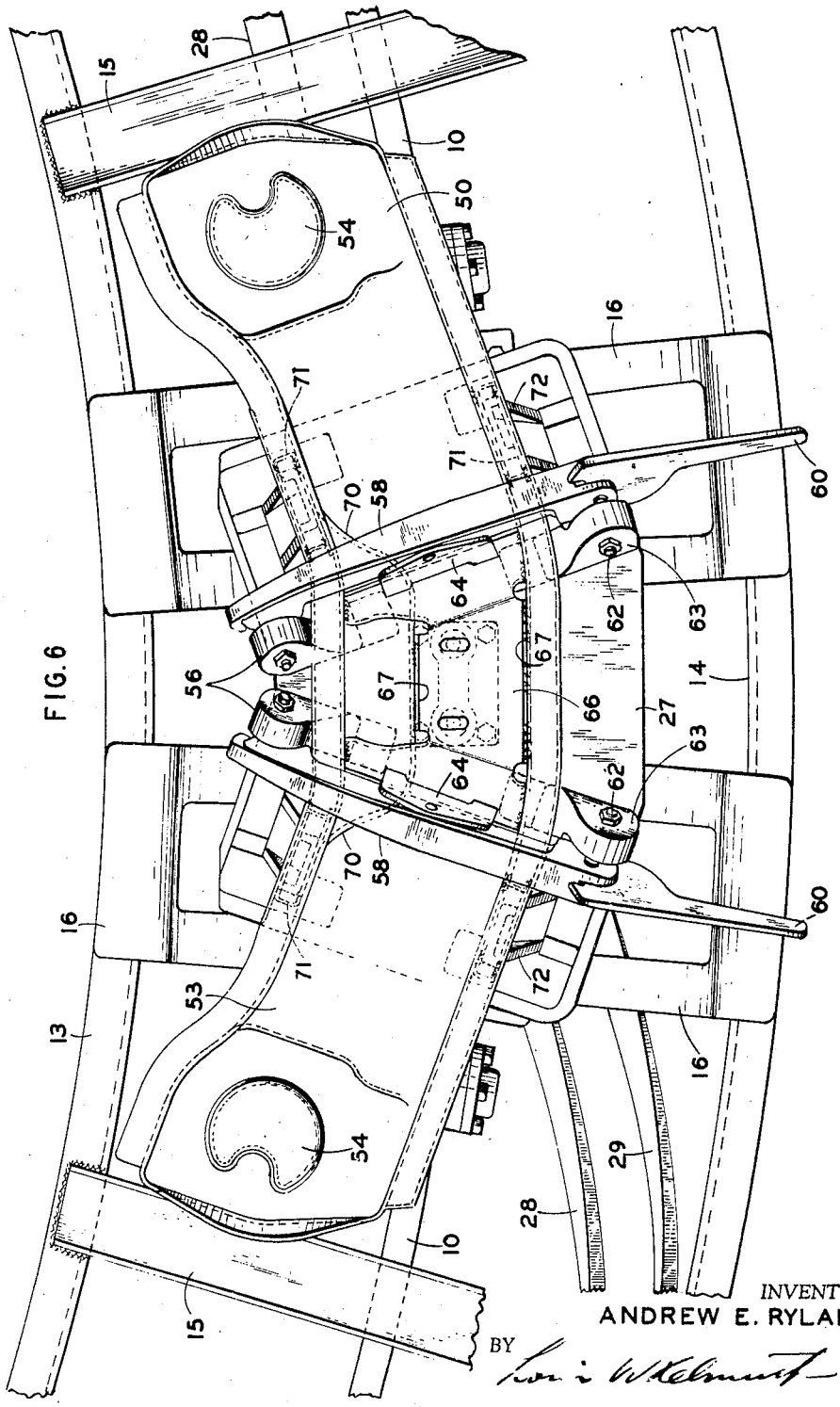
Fig. 6 is a top elevational view of the same portion of the apparatus.

This reinforcement member is shown separate from the cross member 50 in Fig. 9 and is composed of a body part 66 having its opposite edges flanged as at 67 and its two other opposite sides provided with lateral wing portions 68, the upper edges of which are straddled by the pair of clamps 64 carried by the locking levers 60. As best shown in Fig. 6, this reinforcement for the middle of the cross member 50 is positioned with the body portion 66 engaging the underside of the top of the cross member and is disposed within the channel of said cross member with the wings 68 extending obliquely and transversely of the cross member to be secured by arc welding to the vertical sides of the cross member. The rear vertical wall of the cross member has a central inwardly formed embossment 70 to which the edges of the two wings 68 are contoured to fit and be secured. The shorter flange 67 of the reinforcement is also adapted to be welded at the inner face of the embossment 70 of the cross member, while the longer flange 67 of the reinforcement is adapted to be welded to the forward side wall of the cross member. The two free ends of each wing 68 are arc welded to the vertical side walls of the cross member as illustrated by the cross hatch marks in the drawings.

In addition to this internal reinforcement for the cross member, the laterally extending flanges 52 are also reinforced with channel-shaped reinforcements 71 on either side of the central reinforcement 65, and these, likewise are adapted to be metallic arc welded to the undersides of the flanges 52. Stands 72 with removable top pieces are mounted upon the work support 27 at opposite sides of the work to engage the four reinforcing pieces 71 when the work is clamped in the jig structure.

In operation, and referring to Fig. 1, it will be appreciated that the motor 21 is driven to rotate the turntable counter-clockwise in the direction of the arrow shown in Fig. 1. The work holders approach the loading station with the latching cam handles 60 disengaged and the clamping bars 58 thrown back as they remain from the unloading station. Thus, the work holders are in a position to rapidly receive the cross members as they successively reach the loading station. The cross members and reinforcements are clamped in the jigs by swinging the clamps 58 down upon the laterally extending flanges 52 of the cross member and locking them in position by the latches 60, engaging the pins 62. Each cross member firmly clamped on the work support, leaves the loading station in a substantially horizontal position and travels counter-clockwise until it reaches the approximate position of cross-over No. 1 where the cam arm 31 of the work support follows the offset cam tracks 34 and 39, causing the work support to tilt outwardly into the tilted position No. 1 to expose the interior of the work to one or two welding operators positioned on the outside of the turntable at the "Tilt 1" position where they make the welds necessary to hold the reinforcements 71 on the far flange 52 and to weld the long flange 67 of reinforcement 65 to the forward flange of the cross member as well as the adjacent ends of the wings 68. As the member proceeds away from this first welding station, the work support is tilted back to a horizontal position and then inwardly of the turntable by passing through crossover 38 so as to expose the opposite sides of the cross member to welding operators positioned inside of the turntable at the position marked "Tilt 2" where the reinforcements 71 on the opposite edge of the cross member are welded thereto as well as the short flange 67 and adjacent ends of wing 68 to the cross member. From this position the work support is tilted back to a horizontal position by moving through the offset portion 26 of the cam track, where the cross members are disposed horizontally to receive bottom closure plates and the necessary rivets to secure it to the cross member. This last operation consumes the time for the work support to move from the cross over position No. 3 to the unloading station where the clamping bars are released and the cross member is lifted from the holding jig and slid down the unloading chute with the clamping means in open position to proceed again to the loading station to make another circuit.

It will be understood that the inner and outer rings 13 and 14 of the turntable are at all times supported by the rollers 23 on the main track 10 to rotatably mount the turntable, and that the cutout or notched portions 38 in the main track are not coextensive with the rollers 23, so that they will pass over these cross over portions without interference. As the work supports are mounted upon the trunnions 25 with the major portions of the weight of the work holders thereabove, the confinement of the cam rollers 30 in the cam slot will either hold the work holders in a normal horizontal position or tilt the same from one side to the other as the cam groove dictates.

It will be understood that various changes in the size, shape and relation of parts may be resorted to without departing from the spirit of the invention or the scope of the appended claims.

I claim:

1. A conveyor comprising a turntable, means for rotating the same, a work support mounted upon said turntable on an axis normal to the radius thereof, a circular track beneath said turntable, a pair of supporting rollers depending from said turntable and engaging said track, guide means cooperating with said track to form a cam slot therebetween with an offset therein, and an arm depending from the work holder operating in said cam slot for oscillating said holder from side to side at predetermined intervals as the turntable rotates.

2. A conveyor comprising a pair of concentric rings forming a rotary turntable, a circular track arranged under said turntable and intermediate thereof, a pair of spaced transverse brackets connected to said rings and each being provided with a roller engaging said track, trunnion mountings secured to said brackets and extending above the same, a work holder mounted upon said trunnion mountings for oscillation transversely of said turntable, a horizontal cam guide following the general contour of said track, and an arm depending from the work holder between said brackets and cooperating with said cam guide for oscillating the work holder radially of the rotating turntable.

3. A conveyor comprising a ring shaped track, a rotary turntable having rollers running upon said track, a work holder pivotally mounted upon said turntable on an axis substantially normal to the radius thereof, a substantially continuous cam guide of generally circular shape crossing at intervals to opposite sides of the track, and an arm connected to the work holder and operating in said cam guide to oscillate the holder from side to side as the turntable rotates.

4. A conveyor comprising a ring shaped track, a rotary turntable having rollers running upon said track, a work holder pivotally mounted upon said turntable on an axis substantially normal to the radius thereof, a substantially continuous cam guide of generally circular shape crossing at intervals to opposite sides of the track, said track being notched at points where the cam guide intersects the same, said guide cooperating with the track to form guide means, and an arm connected to the work holder to cooperate with said guide means in maintaining the work holder in normal position and in oscillating the same from side to side as the turntable rotates.

5. A conveyor comprising a traveling conveyor body, a work holder mounted upon said body on an axis arranged longitudinally of the direction of movement of said body whereby the weight of the holder tends to tilt the same to one side of said axis, a cam guide, counterweights depending from the axis tending to retain the holder in an intermediate position, and an arm depending from said holder and engaging said guide to alternately tilt the holder to opposite sides of its axis as the turntable rotates.

6. A transfer device comprising a turntable, a stationary guide beneath the same, the work holder mounted on the turntable on an axis normal to its radius and being free to oscillate to either side of a central horizontal position, a pendulum weight suspended from the work holder to counteract its tilting movement to either side of said axis and to normally urge the holder to its normal horizontal position from a tilted position, and means carried by the work holder and engaging said guide to positively tilt the holder from its normal horizontal position to a tilted position.

7. A transfer device comprising an endless track, a carriage movable thereon and having a guide arm, a guide rail paralleling a portion of said track to provide a guide groove therebetween, a pair of parallel guide rails defining a guide groove concentric with said track and having corresponding ends directed toward said track to meet the same at a point of juncture where the first named guide rail terminates, said endless track having a slot at the juncture point of the guide rails whereby the guide arm of the carriage may pass from the groove defined between the pair of guide rails to the groove defined between the track and guide rail.

8. A transfer device comprising an endless track, a carriage movable thereon and having a guide arm, a guide rail paralleling a portion of said track to provide a groove therebetween, a pair of parallel guide rails defining a guide groove concentric with said track and having corresponding ends directed toward said track to meet the same, and the end of the first named guide rail to form a continuous guide groove whereby the guide arm of the carriage can pass from the groove defined between the pair of guide rails to the groove defined between the track and guide rail.

9. A transfer device comprising a turntable composed of a pair of spaced concentric oppositely facing channel rings connected by bridge pieces, the outer ring having sprocket teeth in its channel, a chain wrapped around said outer ring in its channel to engage the sprocket teeth and having a bight portion laterally of said ring, a driver engaging said bight portion, a circular track arranged under said turntable, a work holder mounted on said turntable on an axis normal to the radius thereof, and an arm depending from said work holder and engaging said circular track to retain the holder in a horizontal position during a portion of its circuitous travel.

10. A transfer device comprising a pair of concentric rings, radial connecting pieces connecting said rings to form a turntable, a circular track arranged under and intermediate said rings, rollers carried by said connecting pieces and engaging said track to rotatably support said turntable, guide means associated with said track, a work holder mounted on an axis on said turntable, and an arm for said work holder engaging said guide means to move the holder upon its axis.

11. A transfer device comprising a pair of concentric rings, pairs of radial connecting pieces connecting said rings to form a turntable, a circular track arranged under and intermediate said rings, rollers carried by said pieces and engaging said track to rotatably support said turntable, a trunnion support upon each connecting piece and arranged in pairs, a work holder mounted on each pair of trunnions, and an arm for each work holder depending between each pair of connecting pieces and engaging said track to move said holder upon said trunnions.

ANDREW E. RYLANDER.